United States Patent Office.

R. O. LOWREY, OF SALEM, NEW YORK.

Letters Patent No. 94,832, dated September 14, 1869.

---

IMPROVED COMPOUND OF HARD RUBBER AND FIBROUS MATERIAL.

---

The Schedule referred to in these Letters Patent and making part of the same.

---

*To all whom it may concern:*

Be it known that I, R. O. LOWREY, of Salem, in the county of Washington, and State of New York, have invented certain new and useful Improvements in Compounds of Fibrous Materials and Hard Rubber; and I do hereby declare that the following is a full, clear, and exact description thereof.

To enable others skilled in the art to construct and use my invention, I will proceed to describe it.

My invention relates to composition of matter, and consists in mixing, compounding, uniting, or incorporating the fibres of any fibrous material with a hard-rubber compound, so as to form a soft, pulpy mass, and then pressing or moulding this mass into any form or forms, shape or shapes that may be desired, and vulcanizing them, that is, subjecting them to the vulcanizing-process.

In making my compound, I take a fibrous material of any suitable kind, but preferably such as is used in the manufacture of paper, and reduce it, by any of the usual processes, to a pulpy, flock, or similar state.

The degree of fineness to which the fibre is reduced depends upon the character of the articles for which the compound is designed. When the fibre has been thus reduced, I dry it. If reduced in any other manner, it may not be necessary to dry it, my object being to have the fibre in a fine and dry condition.

When in this condition, I thoroughly mix, compound, and incorporate it with hard-rubber compound, suitably prepared for the purpose. After this mixture has been thus made, I press or mould the mass into any desirable form or forms, shape or shapes, and then subject them to the vulcanizing-process.

In this way I am able to produce an endless variety of useful and ornamental articles.

It is obvious that in the process of compounding the fibre with the rubber compound, any suitable pigment or pigments may be introduced, for the purpose of giving the articles any desired color.

When sawdust or similar fibres of any kind is used, it is evident that the product will, after vulcanization, be a hard, compact mass, possessing, for many purposes, the useful qualities of toughness and durability, and the same is true when other fibres are used.

It is obvious that fibres of different colors may be introduced into the same mass, for the purpose of giving a variegated appearance to the articles made from it.

It is also obvious that any gums that can be vulcanized so as to produce a hard material, similar to hard rubber, may be used with like effect.

In this way I am able to produce a new compound, and out of this compound a great variety of useful and ornamental articles.

I am aware that fibrous materials and soft rubber have been combined and submitted to the process of vulcanization, but, as is well known, the product is more or less elastic, and is not susceptible of being polished. I am also aware that hard rubber is now protected by Letters Patent, and I do not claim a compound of fibrous materials and soft rubber; neither do I claim, in any sense, hard rubber alone.

Having thus described my invention,

What I claim, is—

1. Mixing, uniting, or incorporating the fibres of any fibrous material with hard-rubber compound, and then submitting the mixture to the process of vulcanization, in the manner substantially as herein described, and for the purposes set forth.

2. The products resulting from the process herein described, in whatever form or shape they may be produced, as new articles of manufacture.

R. O. LOWREY.

Witnesses:
 P. T. DODGE,
 H. B. MUNN.